(12) United States Patent
Chen et al.

(10) Patent No.: US 12,444,811 B2
(45) Date of Patent: Oct. 14, 2025

(54) BATTERY MODULE, BATTERY GROUP, POWER CONSUMPTION DEVICE, AND FAILURE HANDLING METHOD

(71) Applicant: CONTEMPORARY AMPEREX TECHNOLOGY (HONG KONG) LIMITED, Hong Kong (CN)

(72) Inventors: Rongcai Chen, Ningde (CN); Huihui Shangguan, Ningde (CN); Di Zhou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 618 days.

(21) Appl. No.: 17/565,911

(22) Filed: Dec. 30, 2021

(65) Prior Publication Data

US 2022/0123440 A1    Apr. 21, 2022

Related U.S. Application Data

(63) Continuation of application No. PCT/CN2020/135945, filed on Dec. 11, 2020.

(30) Foreign Application Priority Data

Apr. 3, 2020    (CN) .......................... 202010265750.7

(51) Int. Cl.
*H01M 50/51*    (2021.01)
*H01M 10/42*    (2006.01)
(Continued)

(52) U.S. Cl.
CPC ....... *H01M 50/51* (2021.01); *H01M 10/4207* (2013.01); *H01M 50/204* (2021.01);
(Continued)

(58) Field of Classification Search
None
See application file for complete search history.

(56) References Cited

U.S. PATENT DOCUMENTS 6,046,514 A    4/2000 Rouillard et al.
8,557,418 B2    10/2013 Byun et al.
(Continued)

FOREIGN PATENT DOCUMENTS

CN    101826611 A    9/2010
CN    102044693 A    5/2011
(Continued)

OTHER PUBLICATIONS

International Search Report and Written Opinion dated Mar. 15, 2021 received in International Application No. PCT/CN2020/135945.
(Continued)

*Primary Examiner* — Ula C Ruddock
*Assistant Examiner* — Mary Grace Byram
(74) *Attorney, Agent, or Firm* — Scully, Scott, Murphy & Presser, P.C.

(57) ABSTRACT

The embodiment of the present application provides a battery module, a battery group, a power consumption device, and a failure handling method. The battery module includes: a plurality of battery units, each of the plurality of battery units including a top cover, where the plurality of battery units includes a failed battery unit after the battery module fails; a connecting plate for connecting the plurality of battery units in series, where the connecting plate includes a first connecting plate connected to the failed battery unit; and a conductive component for electrically connected to the top cover of the failed battery unit, where at least one of the connecting plate and the conductive component is provided with a mating portion for being mated with the other of the
(Continued)

connecting plate and the conductive component, so that the battery module resumes working.

14 Claims, 12 Drawing Sheets

(51) Int. Cl.
*H01M 50/204* (2021.01)
*H01M 50/209* (2021.01)
*H01M 50/249* (2021.01)
*H01M 50/503* (2021.01)
*H01M 50/505* (2021.01)
*H01M 50/574* (2021.01)

(52) U.S. Cl.
CPC ....... *H01M 50/209* (2021.01); *H01M 50/249* (2021.01); *H01M 50/503* (2021.01); *H01M 50/505* (2021.01); *H01M 50/574* (2021.01); *H01M 2220/20* (2013.01)

(56) References Cited

U.S. PATENT DOCUMENTS

| | | | |
|---|---|---|---|
| 10,418,619 B2 | 9/2019 | Li et al. | |
| 2008/0131760 A1* | 6/2008 | Yamagami | H01M 50/342 429/82 |
| 2010/0227205 A1 | 9/2010 | Byun et al. | |
| 2013/0084481 A1* | 4/2013 | Yoon | H01M 50/103 429/99 |
| 2014/0063692 A1* | 3/2014 | Tan | H01M 50/209 361/622 |
| 2014/0227567 A1 | 8/2014 | Han et al. | |
| 2017/0229702 A1* | 8/2017 | Umeyama | H01M 50/578 |
| 2017/0338454 A1* | 11/2017 | Millon | H01M 50/224 |
| 2017/0352861 A1 | 12/2017 | Li et al. | |
| 2020/0083513 A1* | 3/2020 | Lejosne | H01M 10/613 |
| 2021/0143518 A1 | 5/2021 | Zhou et al. | |
| 2021/0313654 A1 | 10/2021 | Xu et al. | |

FOREIGN PATENT DOCUMENTS

| | | |
|---|---|---|
| CN | 202395111 U | 8/2012 |
| CN | 103872710 A | 6/2014 |
| CN | 103996816 A | 8/2014 |
| CN | 105870366 A | 8/2016 |
| CN | 109037569 A | 12/2018 |
| CN | 109216641 A | 1/2019 |
| CN | 209447908 U | 9/2019 |
| CN | 112310570 A | 2/2021 |
| EP | 1414129 A2 | 4/2004 |
| EP | 2768069 A1 | 8/2014 |
| EP | 3506383 A1 | 7/2019 |
| EP | 3599651 A1 | 1/2020 |
| EP | 3846281 A1 | 7/2021 |
| EP | 3916904 A1 | 12/2021 |
| JP | 2013161681 A | 8/2013 |

OTHER PUBLICATIONS

Extended European Search Report dated Aug. 12, 2022 received in European Patent Application No. EP 20922481.5.
First Office Action dated Jul. 12, 2022 received in Chinese Patent Application No. CN 202010265750.7.
Second Office Action dated Jan. 13, 2023 received in Chinese Patent Application No. CN 202010265750.7.

* cited by examiner

BATTERY MODULE, BATTERY GROUP, POWER CONSUMPTION DEVICE, AND FAILURE HANDLING METHOD

CROSS-REFERENCE TO RELATED APPLICATIONS

This application is a continuation of International Application No. PCT/CN2020/135945, filed on Dec. 11, 2020, which claims priority to Chinese patent application 202010265750.7 entitled 'Battery Module, Battery Group, Power Consumption Device, and Failure Handling Method' filed on Apr. 3, 2020, the contents of which are incorporated herein by reference in their entirety.

TECHNICAL FIELD

Embodiments of this application relate to the technical field of an energy storage device, and in particular, to a battery module, a battery group, a power consumption device, and a failure handling method.

BACKGROUND

A battery module includes a plurality of battery units stacked against each other, and the plurality of battery units are electrically connected, so that the battery module outputs electric energy and supplies power to a power consumption device. When any one of battery units fails, an entire circuit of the battery module fails, thereby making the battery module unable to work normally.

SUMMARY

This application provides a battery module, a battery group, a power consumption device, and a failure handling method, which could simplify a maintenance process of the battery module, reduce maintenance cost, and improve working efficiency of the battery module.

A first aspect of embodiments of this application provides a battery module. The battery module includes:
  a plurality of battery units, where each of the plurality of battery units includes a top cover, and the plurality of battery units further include a failed battery unit after the battery module fails;
  a connecting plate, configured to connect the plurality of battery units in series, and included a first connecting plate which is connected to the failed battery unit;
  a conductive component, where the conductive component is configured to be electrically connected to a top cover of the failed battery unit;
  where, at least one of the first connecting plate and the conductive component is provided with a mating portion configured to be mated with the other of the first connecting plate and the conductive component, so as to realize the electrical connection between the top cover of the failed battery unit and the first connecting plate through the conductive component, so that the battery module resumes working.

The conductive component is connected to the top cover of the failed battery unit; and the first connecting plate is connected to the failed battery unit, so as to be able to remove the failed battery unit from the circuit of the battery module, so that the failed battery unit no longer participates in the charging and discharging process of the battery module. That is to say, the failed battery unit does not affect the circuit of the battery module, and the failed battery unit is completely out of the circuit, improving the safety of the battery module.

In a possible design, the mating portion extends toward the other of the first connecting plate and the conductive component, and the mating portion can clamp the one of the first connecting plate and the conductive component with the other to realize the connection between the first connecting plate and the conductive component.

In a possible design, the mating portion is configured to plug-connect with the other of the first connecting plate and the conductive component to realize the connection between the first connecting plate and the conductive component.

In a possible design, the at least one of the first connecting plate and the conductive component is provided with a recessed portion which is used for mating with the corresponding mating portion to realize the connection between the first connecting plate and the conductive component.

The recessed portion capable of be mating with the mating portion is provided, so as to be able to further improve the connection reliability between the first connecting plate and the conductive component.

In a possible design, the recessed portion is a through hole, and at least part of the mating portion can extend toward the other of the first connecting plate and the conductive component through the through hole, so that the mating portion can clamp one of the first connecting plate and the conductive component with the other of the first connecting plate and the conductive component to realize the connection between the first connecting plate and the conductive component.

In a possible design, the recessed portion is a through hole, and part of the mating portion can plug-connect the through hole to realize the connection between the first connecting plate and the conductive component.

In a possible design, the conductive component is provided with one or more of mating portions and the mating portions are used for mating with the first connecting plate to realize the connection between the first connecting plate and the conductive component.

The mating portions are used for mating with the first connecting plate, so as to realize the electrical connection between the top cover of the failed battery unit and the first connecting plate through the conducting component, so that the battery module resumes working.

In a possible design, the conductive component is connected to the top cover of the failed battery unit through a connecting portion.

A second aspect of embodiments of this application provides a battery group, the battery group includes:
  a box body, where the box body forms an accommodating chamber;
  a battery module, where the battery module is the above-mentioned battery module;
  where, the battery module is located in the accommodating chamber.

A third aspect of embodiments of this application provides a power consumption device, including: the above-mentioned battery group, which is configured to provide electrical energy.

A fourth aspect of embodiments of this application provides a failure handling method, processing a failed battery unit, the failed battery unit being connected to a first connecting plate, one of the first connecting plate and a conductive component being provided with a mating portion, the failure handling method including:

electrically connecting the conductive component to a top cover of the failed battery unit;

mating the mating portion to the other of the first connecting plate and the conductive component, so as to realize the connection between the top cover of the failed battery unit and the first connecting plate through the conductive component, so that the battery module resumes working.

In a possible design, the mating portion extends toward the other of the first connecting plate and the conductive component and when mating the mating portion to other of the first connecting plate and the conductive component, the failure handling method includes:

clamping the one of the first connecting plate and the conductive component through the other of the first connecting plate and the conductive component and the mating portion to realize the connection between the first connecting plate and the conductive component.

In a possible design, when mating the mating portion to the other of the first connecting plate and the conductive component, the failure processing method includes:

plug-connecting the mating portion and the other of the first connecting plate and the conductive component to realize the connection between the first connecting plate and the conductive component.

In a possible design, the one of the first connecting plate and the conductive component is provided with a recessed portion, when mating the mating portion with the other of the first connecting plate and the conductive component, the failure processing method includes:

mating the recessed portion with the mating portion to realize the connection between the first connecting plate and the conductive component.

In a possible design, the recessed portion is a through hole and when mating the recessed portion with the mating portion, the failure handling method includes:

extending at least part of the mating portion toward the other of the first connecting plate and the conductive component through the through hole so that the mating portion clamp the one of the first connecting plate and the conductive component with the other of the first connecting plate and the conductive component to realize the connection between the first connecting plate and the conductive component.

In a possible design, the recessed portion is a through hole and when mating the recessed portion with the mating portion, the failure handling method includes:

at least part of the mating portion being plug-connected to the through hole to realize the connection between the first connecting plate and the conductive component.

In a possible design, the conductive component further includes a connecting portion for connecting the conductive component with the failed battery unit, the failure handling method includes:

connecting the connecting portion to the top cover of the failed battery unit through conducting material.

In this embodiment, the conductive component is connected to the top cover of the failed battery unit, and the first connecting plate is connected to the failed battery unit so that the failed battery unit can be removed from the circuit of the battery module. The failed battery unit no longer participates in the charging and discharging process of the battery module, that is, the failed battery unit does not affect the circuit of the battery module, and the failed battery unit is not in the circuit at all, which improves the safety of the battery module. In addition, in this embodiment, during the processing of the failed battery unit, only simple connection is required through the conductive component, and the entire battery module does not need to be replaced.

In some embodiments, the conductive component and the first connecting plate can be connected through a mating portion, thereby improving the reliability of the connection between the conductive component and the first connecting plate. And the conductive component and the first connecting plate are connected by a mechanical connection, and the two do not need to be welded to prevent excessively high temperature from damaging the components of the battery module during the welding process, and improve the life of the battery module.

Understandably, the above general description and the following detailed description are only exemplary without limiting this application.

BRIEF DESCRIPTION OF THE DRAWINGS

In order to more clearly illustrate the technical solutions of the embodiments of this application, the following will briefly introduce the drawings required for describing the embodiments of the present application. Apparently, the drawings in the following description show only some embodiments of the present application, and a person skilled in the art may still derive other drawings from the drawings without creative efforts.

Figure 1:
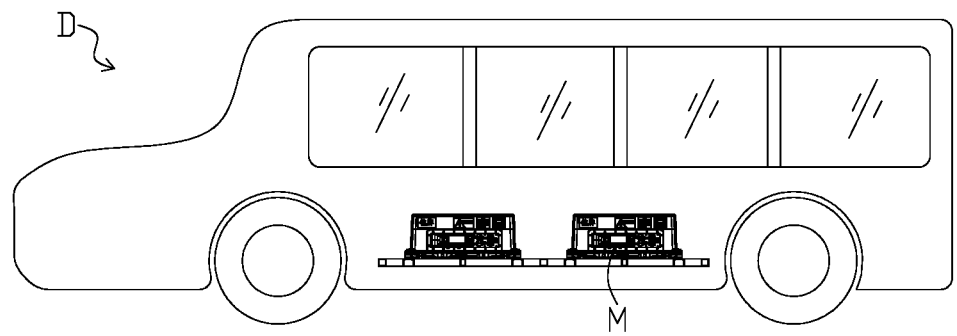
FIG. 1 is a schematic structural diagram of a device provided by an embodiment of this application according to a specific embodiment.

In the drawings, the drawings are not drawn to scale.

The drawings here are incorporated into the specification and constitute a part of the specification, show embodiments that conform to the application, and are used together with the specification to explain the principle of the application.

DESCRIPTION OF EMBODIMENTS

For better understanding of the technical solutions of this application, the following describes embodiments of this application in detail with reference to accompanying drawings.

It is apparent that the described embodiments are only a part of rather than an entirety of the embodiments of this application. All other embodiments derived by a person of ordinary skill in the art based on the embodiments of this application without making any creative efforts shall fall within the protection scope of this application.

The terms used in the embodiments of this application are intended only for describing specific embodiments rather than for limiting this application. Unless otherwise expressly indicated in the context, the words "a", "the", and "this" that precedes a singular noun in the embodiments and claims of this application are intended to include the plural form of the noun.

Understandably, the term "and/or" used herein only describes an association relationship between associated objects and indicates existence of three relationships. For example, "A and/or B" may indicate existence of A alone, coexistence of A and B, and existence of B alone. In addition, the character "/" in the present application generally indicates that the associated objects before and after the character are in an "or" relation.

It needs to be noted that localizers such as "on", "above", "under", "below", "left", and "right" used in the embodiments of this application are described from a perspective shown in the accompanying drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element.

The orientation words appearing in the following description are all directions shown in the drawings, and do not limit the specific structure of this application. In the description of the present application, it should also be noted that, unless specified or limited otherwise, the terms 'mounted', 'connecting', and 'connected' should be understood broadly, and may be, for example, fixed connections, detachable connections, or integral connections, and may also be direct connections or indirect connections through intervening structures. The specific meanings of the described terms in this application can be understood by a person skilled in the art according to specific situations.

An embodiment of this application provides a power consumption device that uses a battery unit as a power supply, a battery group, and a battery module. The power consumption device may be a mobile device such as a vehicle, a ship, or a small aircraft. The power consumption device includes a power source, and the power source is used to provide a driving force for the electrical apparatus.

The power source may be configured as a battery module that provides electrical energy to the power consumption device. The driving force of the power consumption device may be sole electric energy, or may include electric energy and other types of energy (such as mechanical energy). The power source may be a battery module (or a battery group). In addition, the power consumption device may also be an energy storage device such as a battery cabinet. The battery cabinet may include a plurality of battery modules (or battery groups), so that the battery cabinet can output electric energy. Therefore, any power consumption device that can use a battery unit as a power supply shall fall within the protection scope of this application.

As shown in FIG. 1, using a vehicle as an example, a power consumption device D in an embodiment of this application may be a new energy vehicle. The new energy vehicle may be a battery electric vehicle, or may be a hybrid electric vehicle or a range-extended electric vehicle or the like. The vehicle may include a battery group M and a vehicle body. The battery group M is disposed in the vehicle body. A driving motor is further disposed in the vehicle body, and the driving motor is electrically connected to the battery group M. The battery group M provides electrical energy. The driving motor is connected to wheels of the vehicle body through a transmission mechanism to drive the vehicle to run. Specifically, the battery group M may be horizontally disposed at a bottom of the vehicle body.

Figure 2:
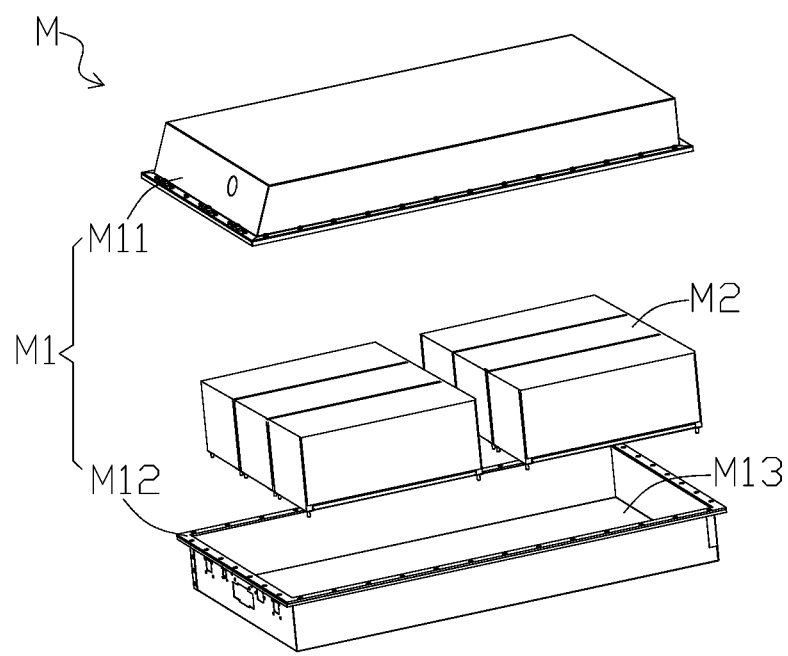
FIG. 2 is a schematic diagram of the structure of the battery group in FIG. 1 according to a specific embodiment.

As shown in FIG. 2, the battery group M includes a box body M1 and a battery module M2 in an embodiment of this application. The box body M1 has an accommodation cavity M13. The battery module M2 is accommodated in the accommodation chamber M13. The battery module M2 may be one or more in number. A plurality of battery modules M2 are arranged in the accommodation chamber M13. The box body M1 is not limited in terms of type, and may be a frame-shaped box body, a disk-shaped box body, or a container-shaped box body. Specifically, as shown in FIG. 2, the box body M1 may include a lower box body M12 accommodating the battery module M2 and an upper box body M11 engaging with the lower box body M12.

It needs to be noted that a length direction X, a width direction Y, and a height direction Z mentioned herein are defined with reference to a battery unit. The length direction X means a thickness direction of the battery unit. The width direction Y means a width direction of the battery unit, and the width direction Y and the length direction X are perpendicular (approximately perpendicular) to each other and located on a same plane. The height direction Z means an extension direction of electrode terminals in the battery unit. In the battery module, the length direction X, the width direction Y, and the height direction Z are perpendicular (approximately perpendicular) to each other. That is, the height direction Z is perpendicular to a plane formed by the width direction Y and the length direction X.

The battery module includes a plurality of battery units and a frame structure configured to fix the battery units. The plurality of battery units may be stacked on each other along the length direction X. The frame structure may include end plates. The end plates are respectively located at two ends of the battery units along the length direction X, and are used to limit movement of the battery units along the length direction X. At the same time, in a specific embodiment, the frame structure may further include side plates. The two side plates are respectively located on two sides of the battery units along the width direction Y, and the side plates are connected to the end plates to form the frame structure. In another embodiment, the frame structure may have no side plate, and the battery units are connected by a first binding strap or by both a first binding strap and a second binding strap after being stacked. The end plates and the binding strap form the frame structure. In addition, in a specific embodiment, the battery group may include a box body and a plurality of battery units. The box body has an accommodation chamber. The plurality of battery units is located in the accommodation chamber, and may be connected to the box body. Specifically, the battery units may be bonded to an inner wall of the box body through a structural adhesive.

During the working process of the battery module, each battery unit is continuously charged and discharged, and the battery unit has a problem (such as abnormal capacity attenuation), which causes the battery unit to fail to work normally. Therefore, in this application, a battery unit which can't work normally with failure is defined as a failed battery unit and a battery unit which can work normally without failure is defined as a non-failed battery unit. At this time, due to the existence of one or more failed battery units in the battery module or battery group, its circuit fails and cannot supply power normally, that is, the battery module or battery group fails. In order to solve this technical problem, an embodiment of the present application solves the technical problem by removing the failed battery unit from the circuit of the battery module and forming the circuit again.

It should be noted that the battery unit mentioned in the embodiment of the present application may include the following two circumstances. In a first circumstance, when the battery module is formed by serial-connecting a plurality of battery units, the battery unit in the embodiment of this application may be a single battery unit. Correspondingly, the failed battery unit may be one of failed battery cells. In a second circumstance, when the battery module includes at least one parallel assembly formed by parallel-connecting two or more battery cells, the battery unit in the embodiment of this application may be a parallel assembly. Correspondingly, the failed battery unit is one of the parallel assemblies, and the parallel assembly includes at least one failed battery cell.

In addition, the battery unit mentioned in the embodiment of this application may be a pouch-type cell, or may be a prismatic cell or a cylindrical cell or the like.

Figure 3:
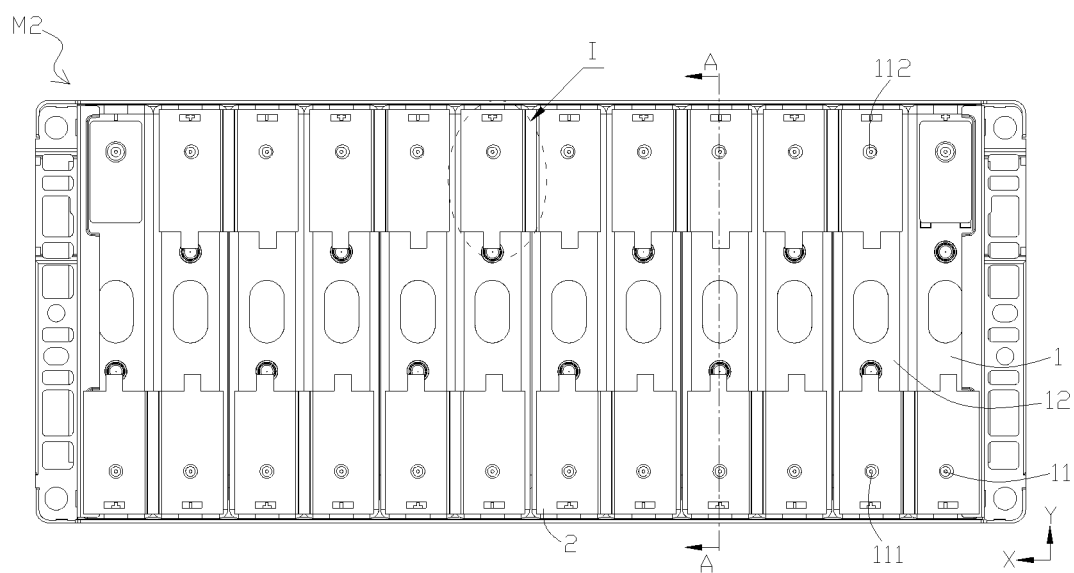
FIG. 3 is a top view of the battery module in FIG. 2 in a specific embodiment.

To solve the above technical problem, the embodiment of this application provides the battery module M2, as shown in FIG. 3, the battery module M2 can work normally. The battery module M2 includes a plurality of battery units 1, each battery unit 1 includes a top cover 12 and an electrode terminal 11, and the electrode terminal 11 includes a first electrode terminal 111 and a second electrode terminal 112 with opposite polarities, and the electrode terminal 11 is disposed on the top cover 12 of the battery unit 1. Meanwhile, the battery module M2 further includes connecting plates 2. The connecting plates 2 are connected to the electrode terminals 11 of the plurality of battery units 1 to connect the plurality of battery units 1 in series.

Figure 4:
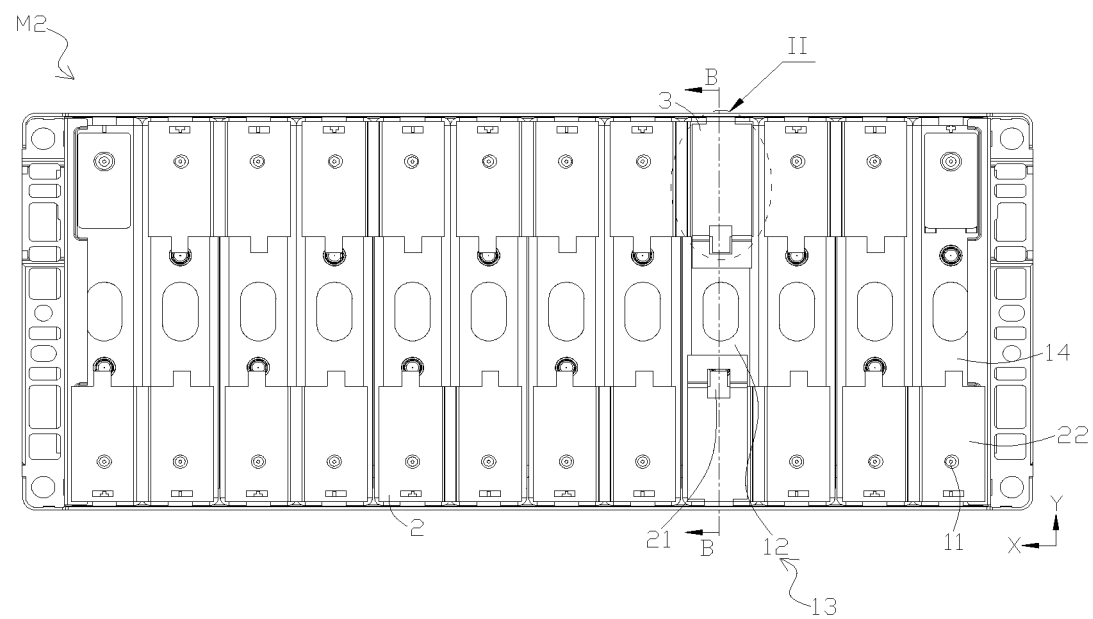
FIG. 4 is a top view of the battery module in FIG. 3 with a failed battery unit.

When the battery module M2 in the embodiment of the present application fails, as shown in FIG. 4, the failed battery module M2 includes a plurality of non-failed battery units 14 and at least one failed battery unit 13. At this time, the connecting plate 12 of the battery module M2 includes a first connecting plate 21 and a second connecting plate 22. The first connecting plate 21 is used to connect to the failed battery unit 13 and the non-failed battery unit 14, and the second connecting plate 22 is used to connect to two non-failed battery units 14. Meanwhile, the battery module M2 also includes a conductive component 3, which is a component capable of conducting electricity to achieve electrical connection, where the conductive component 3 is used to connect with the top cover 12 of the failed battery unit 13 and is used to connect to the first connecting plate 21 so that the top cover 12 of the failed battery unit 13 and the first connecting plate 21 can be electrically connected through the conductive component 3. And after connection, the failed battery unit 13 can be short-circuited, so that the battery module M2 can resume working, where, resume working means that the battery module M2 can be charged or discharged normally.

In existing designs, when a battery unit in the battery group fails, people may think of replacing the failed battery unit, or, in order to improve repair efficiency, think of replacing and repairing the entire battery module. Consequently, in a repair process, the failed battery group (the battery group containing the failed battery unit) needs to be returned to a manufacturer, and the manufacturer needs to match a corresponding battery unit or battery module. Alternatively, a model of the corresponding battery unit or battery module needs to be sent to the manufacturer. This process consumes a lot of time for waiting, and is not conducive to optimization of resources.

The above handling method is consistent with handling methods in most fields, in which the failed part or structure is replaced to make the overall structure resume working. Therefore, at repair service points in most fields, samples of parts that are vulnerable to failure are stored, and simple test devices are made readily available. If a part that is not vulnerable to failure fails, or, if a part that is not easy to store or place fails, the repair service point needs to call the part from the manufacturer to be able to replace or repair the part. If a complicated repair method is required, the repair service point has to request technical support from corresponding technicians of the manufacturer.

In the battery field, battery units account for a large proportion of the failed parts of the battery group. However, there are many difficulties in storing samples of the battery units. In addition, the battery units are not suitable for being stored for a long time because: 1. currently battery units have many models differing in size, capacity, chemical system, structure, and the like; 2. self-discharge occurs when the battery units are stored for a long time, and a capacity balance between a positive electrode terminal and a negative electrode terminal of a battery unit will be gradually broken and the imbalance will deepen over time; and 3. during long-term storage, irreversible capacity losses will also accumulate due to a decomposition reaction of the electrolyte. In addition, storage conditions of the battery units are demanding. With adverse environmental factors, the self-discharge of the battery units may accelerate.

Even if all battery units are of the same structure without involving the problem of models, parameters such as a capacity and a self-discharge speed of a battery unit need to be measured again if the battery unit needs to be put into use after being stored for a long time. However, at general repair service points, such test conditions are lacking, and operators lack professional analysis capabilities. Without retesting the battery unit, normal working of a repaired battery group cannot be ensured. In addition, with the problem of battery models, each repair service point not only needs to reserve battery units of different models, but also need to be equipped with related test devices and corresponding technicians. Therefore, it is difficult for the repair service point to implement the repair method of replacing the battery unit.

Therefore, in order to improve repair efficiency of the battery group, the operator will replace a failed battery module in the battery group (the failed battery module means a battery module containing a failed battery unit). This method implements repair quickly. However, a battery module includes a plurality of battery units. In rare circumstances, all battery units in a battery module fail. In normal circumstances, the battery module cannot work normally if just a small number of battery units in a battery module fail (for example, only one battery unit fails). In this case, replacing the entire battery module causes a waste of resources.

Moreover, a new replaced battery module will have a considerable problem in battery balancing. When a battery group is in normal use, a capacity of the battery group will attenuate, and the capacity differs between the new battery module and an old battery module after the replacement. According to the Buckets Effect, the capacity of the battery group depends on the battery module of the lowest capacity. Therefore, the new replacement battery module does not work well in the structure. Further, due to capacity attenuation, the old battery module is always fully charged and fully discharged, thereby speeding up ending of a service life of the old battery module. In addition, an internal resistance of the old battery module is higher than that of the new replacement battery module, and the same current flows through the old battery module and the new replacement battery module. In this case, the old battery module with a higher internal resistance generates more heat. That is, the battery unit in the old battery module has a higher temperature, and deteriorates at a higher speed, thereby further increasing the internal resistance of the old battery module. Therefore, the increase of the internal resistance and the rise of temperature of the battery unit form a pair of negative feedback, and accelerate the deterioration of the battery unit that has a high internal resistance.

On the other hand, for a circuit of a power consumption device, both a short circuit and an open circuit depict a circuit fault. Currently, the short circuit is mainly used to realize fuse blowout, or used for a load of other test devices. However, no one adds a conductive component into the corresponding structure to short-circuit the failed battery unit because this practice is simply considered problematic and unable to achieve goals. However, short-circuiting one of the battery units in the entire battery module ensures normal use of the battery group without causing a high volatility in capacity.

In this embodiment, as shown in FIG. 4, the failed battery unit 13 is short-circuited by the conductive component 3, so that the failed battery unit 13 can no longer participate in the circuit of the battery module M2, that is, the failed battery unit 13 does not affect the battery module M2. The circuit improves the safety of the battery module M2. Moreover, in this embodiment, only simple connection is required through the conductive component 3, without a need to replace the entire battery module M2. When the battery module M2 is applied to a vehicle, the vehicle can be directly repaired at the repair service point without returning the entire vehicle to the manufacturer or without replacing with a new battery group M, thereby improving repair efficiency of the battery module M2 and simplifying a maintenance process and reducing maintenance cost. In addition, after the above operations are performed, only a small number of failed battery units 13 in the battery module M2 do not participate in formation of the circuit. It ensures the battery module M2 and the battery group to work normally without causing a significant decrease in the battery capacity of the battery module M2.

In addition, in the battery group, for a structure in which the battery unit is directly bonded to an accommodation chamber of a box body through a binder, when a battery unit fails, it is not easy to perform an operation of removing the failed battery unit from the accommodation chamber. Therefore, the handling method in this embodiment has advantages of convenient operation and high efficiency.

Figure 5:
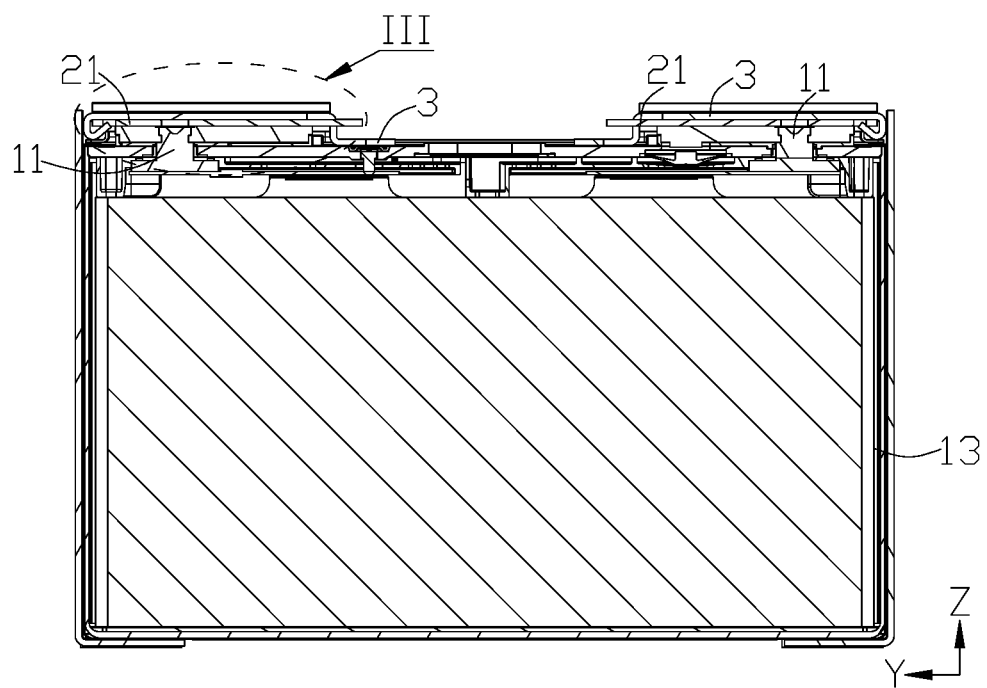
FIG. 5 is a cross-sectional view taken along line B-B of FIG. 4.

Where, as shown in FIG 3 and FIG. 5, the above-mentioned connecting plate includes a first connecting plate 21, where the first connecting plate 21 is a connecting plate connected to the failed battery unit 13, and the connecting plates which are connected to the first electrode terminal 111 and the second electrode terminal 112 of the failed battery unit 13 are the first connecting plates. Meanwhile, the two first connecting plates 21 are connected to the top cover 12 of the failed battery unit 13 through the conductive component 3 so as to short-circuit the first electrode terminal 111 and the second electrode terminal 112 of the failed battery unit 13.

Figure 6:
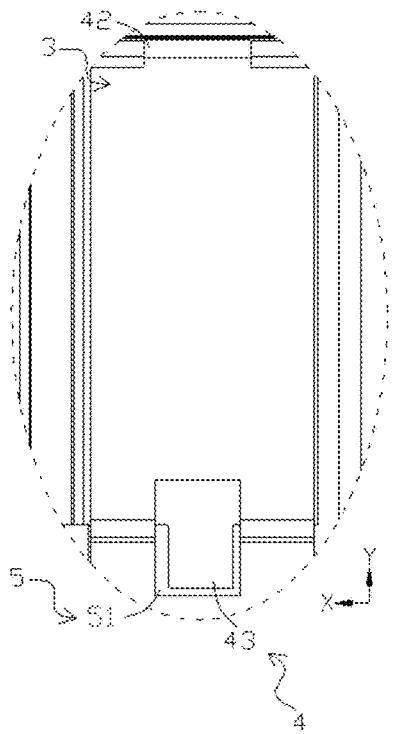
FIG. 6 is a partially enlarged view of part II in FIG. 4.

Specifically, as shown in FIG. 6, at least one of the first connecting plate 21 and the conductive component 3 is provided with a mating portion 4, and the mating portion 4 is used to mate with the other of the first connecting plate 21 and the conductive component 3. More specifically, the solution specifically includes: (1) the first connecting plate 21 is provided with a mating portion 4 for mating with the conductive component 3; (2) the conductive component 3 is provided with a mating portion 4, and the mating portion 4 is used for mating with the first connecting plate 21; (3) the first connecting plate 21 and the conductive component 3 are both provided with a mating portion 4, where the mating portion 4 provided on the first connecting plate 21 is used for mating with the conductive component 3, and the mating portion 4 provided on the conductive component 3 is used for mating with the first connecting plate 21.

It should be noted that the solution of the embodiment of the present application can be any one of the above three solutions, and the above three solutions can all realize the connection between the conductive component 3 and the first connecting plate 21. Meanwhile, since the conductive component 3 is still connected to the top cover 12 of the failed battery unit, so that the connection between the top cover 12 of the failed battery unit and the first connecting plate 21 can be realized through the conductive component 3, so that the battery module can resume working.

Figure 7:
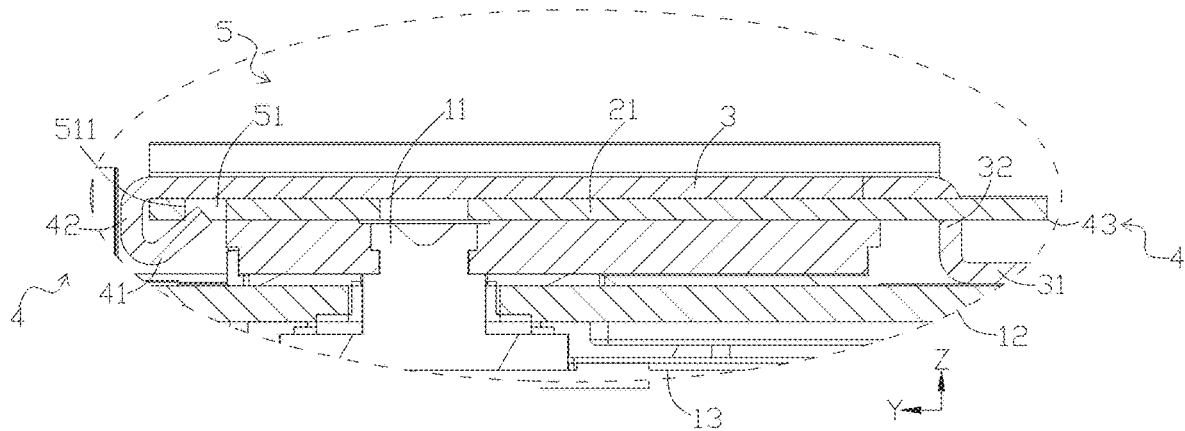
FIG. 7 is a partially enlarged view of part III in FIG. 5.

In a specific embodiment, as shown in FIG. 7, the mating portion 4 extends toward the other of the first connecting plate 21 and the conductive component 3, and the mating portion 4 can clamp the one of the first connecting plate 21 and the conductive component 3 with the other of the first connecting plate 21 and the conductive component 3 to realize the connection between the first connecting plate 21 and the conductive component 3.

In this embodiment, the first connecting plate 21 and the conductive component 3 are specifically clamp-connected by the mating portion 4. Based on this, the above three solutions are: (1) the mating portion 4 provided on the first connecting plate 21 extends toward the direction of the conductive component 3 so that the mating portion 4 and the first connecting plate 21 clamp the conductive component 3; (2) the mating portion 4 provided on the conductive component 3 extends toward the direction of the first connecting plate 21 so that the mating portion 4 and the conductive component 3 clamp the first connecting plate 21; (3) the mating portion 4 provided on the first connecting plate 21 extends toward the direction of the conductive component 3 so that the mating portion 4 and the first connecting plate 21 clamp the conductive component 3, and meanwhile the mating portion 4 provided on the conductive component 3 extends toward the direction of the first connecting plate 21 so that the mating portion 4 and the conductive component 3 clamp the first connecting plate 21.

In this embodiment, when the first connecting plate 21 and the conductive component 3 are clamp-connected, the connection area of the two is relatively large, so that the reliability of the mechanical connection between the two can be improved. In addition, the above solution (3) can further improve the reliability of the connection between the first connecting plate 21 and the conductive component 3.

In the embodiment shown in FIG. 7, the conductive component 3 is provided with the above-mentioned mating portion 4, and at least part of the mating portion 4 extends below the first connecting plate 2 so that the first connecting plate 2 is clamped by the conductive component 3 and the mating portion 4.

Further, at least one of the first connecting plate 21 and the conductive component 3 is further provided with a recessed portion 5, where the recessed portion 5 is used for mating with the mating portion 4 to realize the connection between the first connecting plate 21 and the conductive component 3.

In this embodiment, the above three solutions are: (1) the first connecting plate 21 is provided with a mating portion 4, and the conductive component 3 is provided with a recessed portion 5, and the mating portion 4 is used to mate with the recessed portion 5; (2) the conductive component 3 is provided with a mating portion 4, and the first connecting plate 21 is provided with a recessed portion 5, and the mating portion 4 is used to mate with the recessed portion 5; (3) both of the first connecting plate 21 and the conductive component 3 are both provided with a mating portion 4 and a recessed portion 5, where the mating portion 4 and the recessed portion 5 are provided correspondingly, so that the first connecting plate 21 and the conductive component 3 are connected through the mating portion 4 and the recessed portion 5 which are correspondingly provided.

In addition, in this embodiment, between the first connecting plate 21 and the conductive component 3, in addition to mate through the mating portion 4 and the recessed portion 5, the two can also be clamp-connected or plug-connected.

In this embodiment, the recessed portion 5 is provided to mate with the mating portion 4, such that the reliability of the connection between the first connecting plate 21 and the conductive component 3 can be further improved.

More specifically, in the embodiment shown in FIG. 7, the conductive component 3 is provided with the above-mentioned mating portion 4. Meanwhile, the first connecting plate 2 is provided with a recessed portion 5. At least part of the mating portion 4 extends below the first connecting plate 21, and the mating portion 4 can mate with the recessed portion 5. Therefore, in this embodiment, in addition to the clamping connection between the first connecting plate 21 and the conductive component 3, the mating portion 4 of the conductive component 3 also mates with the recessed portion 5 of the first connecting plate 21 to limit the relative movement of the conductive component 3 and the first connecting plate 21, so as to further improve the connection reliability between the conductive component 3 and the first connecting plate 21.

Where, as shown in FIG. 7, the mating portion 4 may specifically include a limiting hook 41 and an extension portion 42. The two ends of the extension portion 42 are connected with the limiting hook 41 and the conductive component 3, and the extension portion 42 makes the limiting hook 41 extend below the first connecting plate 21 so as to clamp the first connecting plate 21 through the conductive component 3 and the limiting hook 41. Meanwhile, the recessed portion 5 provided in the first connecting plate 21 may specifically be a through hole 51, and a part of the limiting hook 41 can also extend into the through hole 51, so that the side wall 511 of the through hole 51 can limit movement of the limiting hook 41 to realize the connection between the mating portion 4 and the recessed portion 5.

On the other hand, as shown in FIG. 7, the conductive component 3 in the embodiment of the present application may further include a connecting portion 31 and a transition portion 32. The connecting portion 31 is used to electrically connect the top cover 12 of the failed battery unit 13. The transition portion 32 connects the conductive component 3 and the connecting portion 31. Since the connecting portion 31 is used to connect to the top cover 12, there is a height difference between the connecting portion 31 and the conductive component 3 along the height direction Z of the battery unit. When the transition portion 32 connects both of the connecting portion 31 and the conductive component 3, the transition portion 32 extends substantially along the height direction Z of the battery unit. Where, the connecting portion 31 and the top cover 12 are specifically connected by conductive material.

Figure 8:
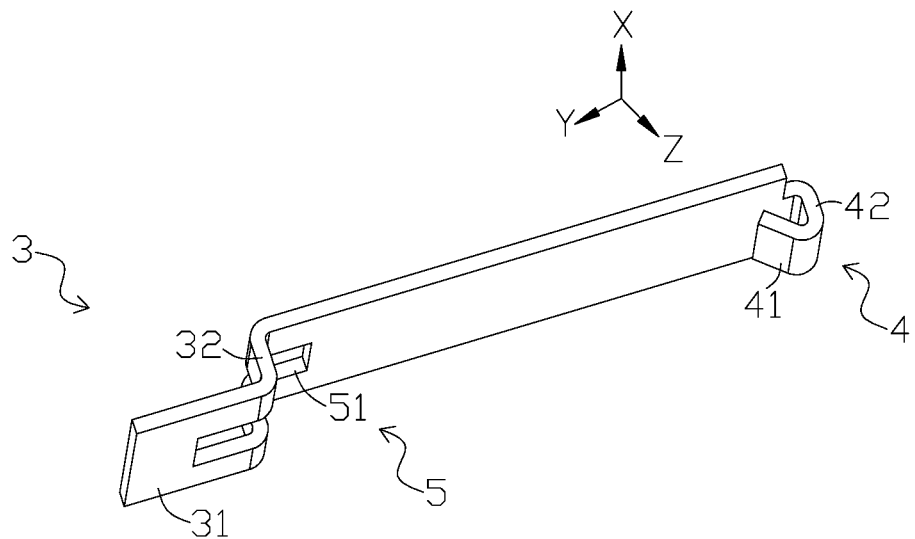
FIG. 8 is a schematic structural diagram of the conductive component in FIG. 7 according to a first specific embodiment.
Figure 9:
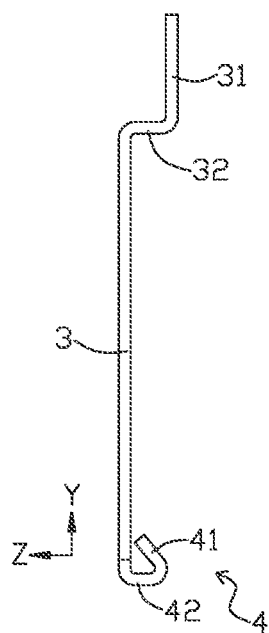
FIG. 9 is a side view of FIG. 8.
Figure 10:
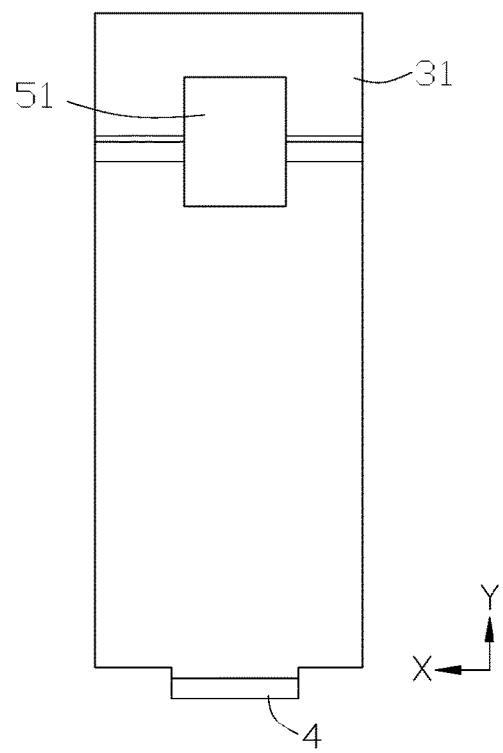
FIG. 10 is a top view of FIG. 8.
Figure 11:
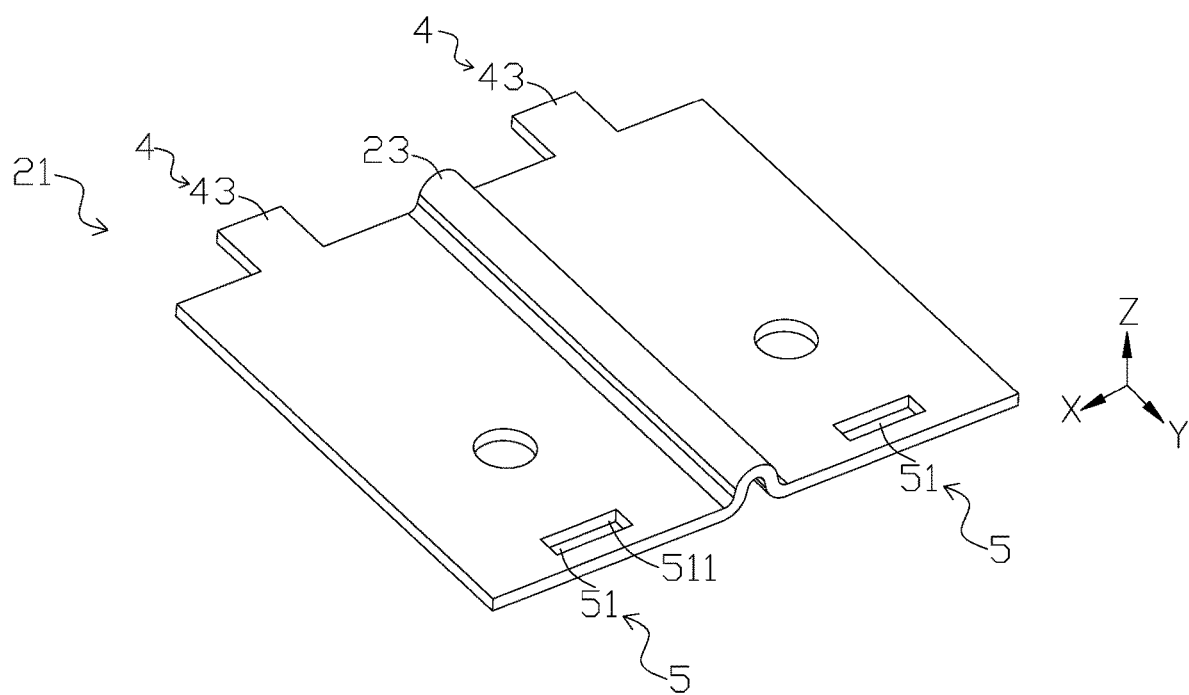
FIG. 11 is a schematic structural diagram of the first connecting plate in FIG. 7 according to a first specific embodiment.

In the embodiment shown in FIG. 7, the conductive component 3 may specifically have the structure shown in FIGS. 8-10, and the first connecting plate 21 may specifically have the structure shown in FIG. 11, combined with the structure shown in FIGS. 7-11, in a specific embodiment, the conductive component 3 may include the mating portion 4 and the mating portion 4 may specifically include a limiting hook 41 and an extension portion 42, and the mating portion 4 may be disposed at an end of the conductive component 3. Meanwhile, the conductive component 3 may further include a connecting portion 31 and a transition portion 32, and the connecting portion 31 is used to connect with the top cover of the failed battery unit.

In addition, in the embodiment shown in FIG. 8, the conductive component 3 is further provided with a recessed portion 5 and the recessed portion 5 may specifically be a through hole 51. The through hole 51 may be provided at an end away from the mating portion 4. In the embodiment shown in FIG. 8, the through hole 51 is provided in the connecting portion 31 and the extension portion 32.

Correspondingly, in the embodiment shown in FIG. 11, the first connecting plate 21 mating with the above-mentioned conductive component is provided with a recessed portion 5. The recessed portion 5 may specifically be a through hole 51, and the above-mentioned mating portion can be plug-connected to the through hole 51. In the embodiment shown in FIG. 11, the through hole 51 is disposed close to the end of the first connecting plate 21, and after the limiting hook of the conductive component extends below the first connecting plate 21, it can mate with the through hole 51. Meanwhile, the first connecting plate 21 is also provided with a mating portion 4, which may specifically be a bump 43. And during the process of with the conductive component with the first connecting plate 21, the bump 43 can pass through the through hole of the conductive component, so as to realize the cooperation between the bump 43 and the through hole.

In addition, as shown in FIG. 11, the above-mentioned connecting plate may further include a bending portion 23, which is bent relative to the first connecting plate 21 along the height direction Z of the battery unit. When vibration occurs in the working process of the battery module, the bending portion 23 can be deformed along the thickness direction X of the battery module, thereby buffering the tensile force received by the connecting plate and improving the life of the connecting plate.

Figure 12:
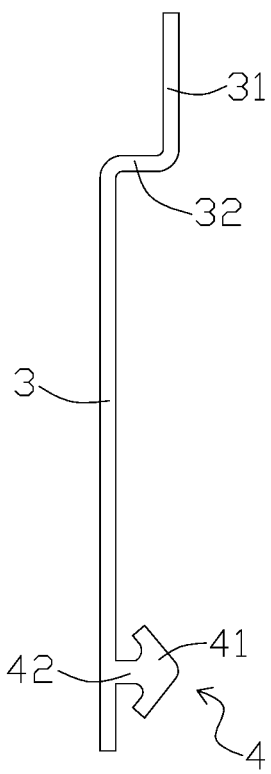
FIG. 12 is a schematic structural diagram of the conductive component in FIG. 7 in a second specific embodiment.

It should be noted that the structure of the above-mentioned conductive component is not limited to this. In the embodiment shown in FIG. 12, the mating portion 4 of the conductive component 3 may not be disposed at the end of the conductive component 3. When the conductive component 3 mates with the first connecting plate 21 shown in FIG. 11, the mating portion 4 can extend below the first connecting plate 21 through the through hole 51. At this time, at least part of the limiting hook 41 of the mating portion 4 is located in the through hole 51, and the limiting hook 41 and the conductive component 3 clamp the first connecting plate 21 together.

Figure 13:
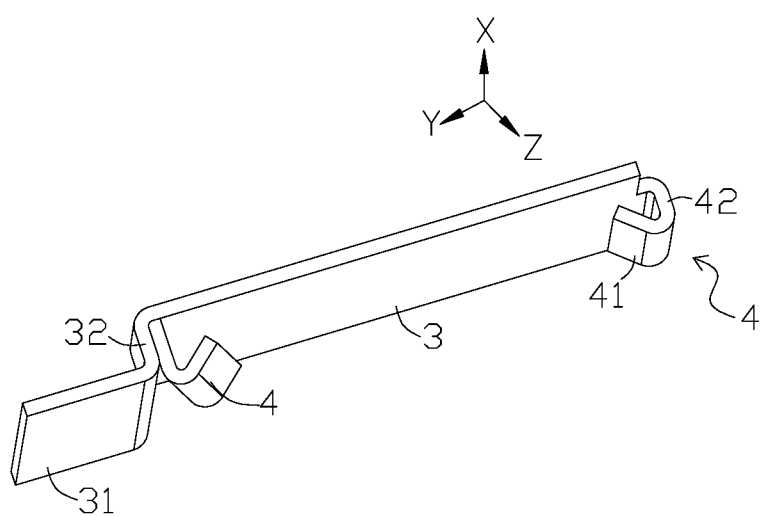
FIG. 13 is a schematic structural diagram of the conductive component in FIG. 7 according to a third specific embodiment.
Figure 14:
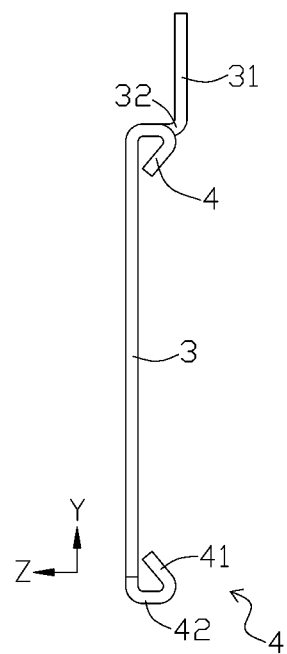
FIG. 14 is a side view of FIG. 13.

In another specific embodiment, there may be a plurality of the above-mentioned mating portions 4, and the plurality of mating portions 4 are arranged at intervals. As shown in FIG. 13 and FIG. 14, the conductive component 3 may be provided with a plurality of mating portions 4, and each of the mating portions 4 can be mated with the first connecting plate to realize the connection between the conductive component 3 and the first connecting plate, where each of the structure of the mating portions 4 may be the same or different as long as the connection with the first connecting plate can be realized.

Specifically, each of the mating portions 4 of the conductive component 3 can extend below the first connecting plate, so that each of the mating portions 4 can clamp the first connecting plate through the conductive component 3. In the embodiment shown in FIG. 13 and FIG. 14, the conductive component 3 is provided with two mating portions 4, and the structure of the two mating portions 4 may be the same. Both mating portions include an extension portion 42 and a limiting hook 41, where the extension portion 42 is used to realize that the limiting hook 41 extends toward the bottom of the first connecting plate, and the limiting hook 41 is used to clamp the first connecting plate through the conductive component 3. In addition, the two mating portions 4 in this embodiment can be arranged oppositely.

In this embodiment, when the mating portion 4 is provided on the conductive component 3, it is not necessary to process the mating portion 4 on the first connecting plate, thereby simplifying the structure of the first connecting plate. The operation of processing the mating portion 4 can be performed outside the battery module. The impact on the components of the battery module is small, thereby realizing the connection between the conductive component 3 and the first connecting plate and simplifying the maintenance process.

Figure 15:
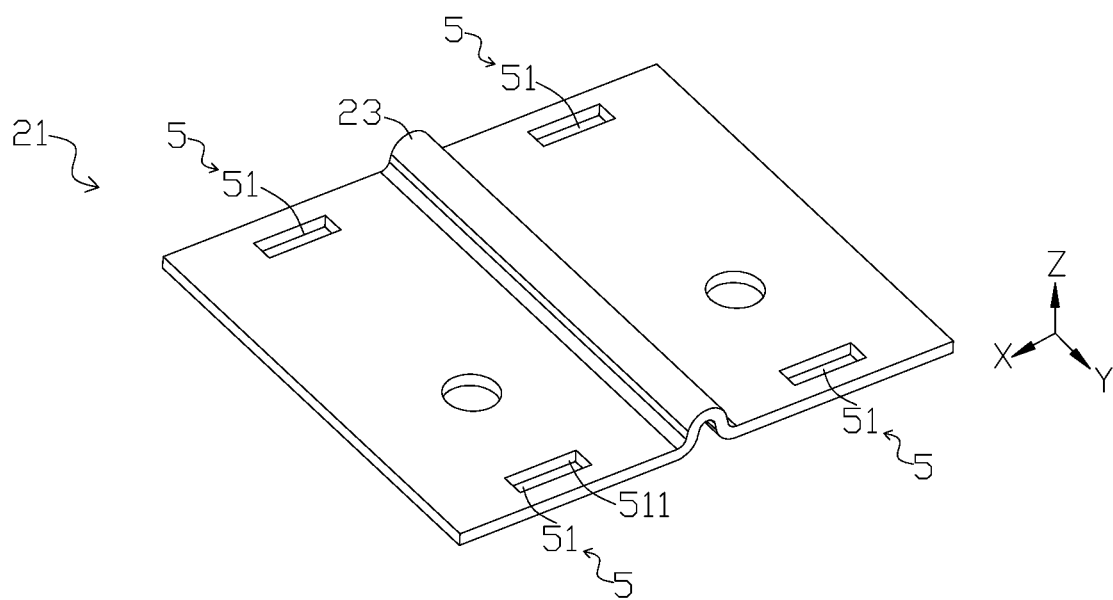
FIG. 15 is a schematic structural diagram of the first connecting plate in FIG. 7 according to a second specific embodiment.

More specifically, the first connecting plate 21 mating with FIG. 13 and FIG. 14 may have a structure as shown in FIG. 15. The first connecting plate 21 is provided with two recessed portions 5, and the two recessed portions 5 may be through holes 51. When the first connecting plate 21 is mated with the conductive component 3 shown in FIG. 13 and FIG. 14, the two mating portions 4 respectively extend from the corresponding through holes 51 below the first connecting plate 21, so that the first connecting plate 21 is clamped between two mating portion 4 and the conductive component 3. Meanwhile, at least part of the limiting hook 41 of the mating portion 4 can also be located in the through hole 51 so as to further limit the relative movement of the limiting hook 41 and the first connecting plate 21.

In another possible design, the mating portion is used for clamping the other of the first connecting plate and the conductive component, so as to realize the connection between the first connecting plate and the conductive component.

In this embodiment, the first connecting plate and the conductive component are clamp-connected by a mating portion. Based on this, the above three solutions are as follows: (1) the mating portion provided on the first connecting plate is clamped with the conductive component so as to realize the connection between the first connecting plate and the conductive component through the mating portion; (2) the mating portion provided on the conductive component is clamped with the first connecting plate so as to realize the connection between the first connecting plate and the conductive component through the mating portion; (3) the mating portion provided on the first connecting plate is clamped with the conductive component, and the mating portion provided on the conductive component is clamped with the first connecting plate so as to realize the connection between the first connecting plate and the conductive component through the mating portion.

In this embodiment, when the first connecting plate is clamp-connected with the conductive component, the two have a simple structure and the reliability of the mechanical connections between the two is high. Further, the above solution (3) can further increase the connection reliability between the first connecting plate and the conductive component.

Figure 16:
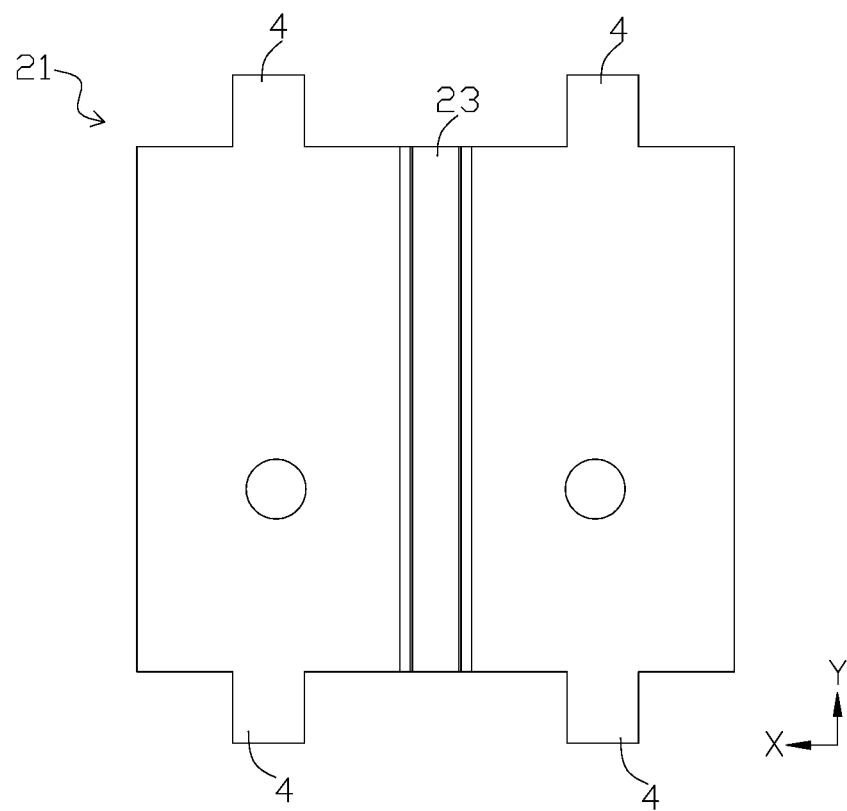
FIG. 16 is a schematic structural diagram of the first connecting plate in FIG. 7 according to a third specific embodiment.

As shown in FIG. 16, the first connecting plate 21 is provided with a plurality of mating portions 4, each of which is arranged at intervals and can be clamped with the conductive component.

Figure 17:
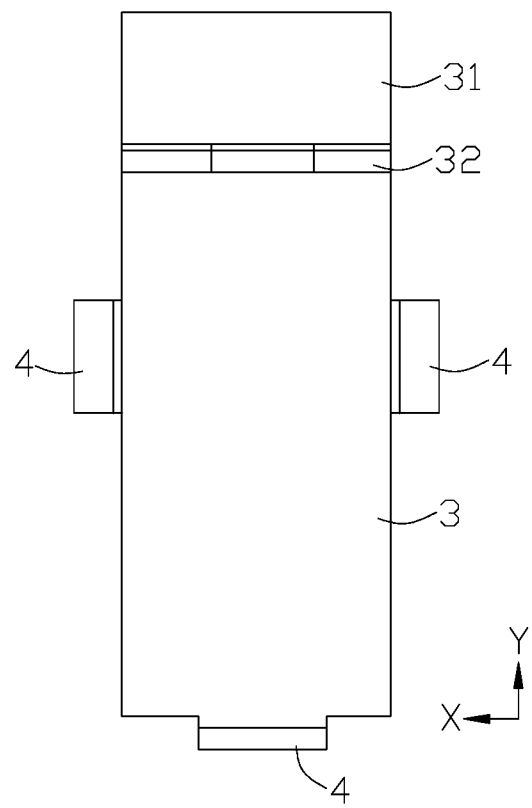
FIG. 17 is a schematic structural diagram of the conductive component in FIG. 7 according to a fourth specific embodiment.

As shown in FIG. 17, the conductive component 3 is provided with a plurality of mating portions 4, each mating portion 4 is arranged at intervals and can be directly clamped with the first connecting plate. And the structures of each mating portion 4 may be the same or different.

In this embodiment, when the mating portion 4 is provided on the conductive component 3, it is not necessary to process the mating portion 4 on the first connecting plate, thereby simplifying the structure of the first connecting plate. The operation of processing the mating portion 4 can be performed outside the battery module. The impact on the components of the battery module is small, thereby realizing the connection between the conductive component 3 and the first connecting plate and simplifying the maintenance process.

Further, at least one of the first connecting plate and the conductive component is further provided with a recessed portion, where the recessed portion is used for clamping with the corresponding mating portion so as to realize the connection between the first connecting plate and the conductive component.

In this embodiment, the above three solutions are as follows: (1) the first connecting plate is provided with a mating portion and the conductive component is provided with a recessed portion, where the mating portion is used for clamping with the recessed portion; (2) the conductive component 3 is provided with mating portion and the first connecting plate is provided with a recessed portion, where the mating portion is used for clamping with the recessed portion; (3) Both the first connecting plate and the conductive component are provided with a mating portion and a recessed portion, where the mating portion and the recessed portion are arranged correspondingly, so that the first connecting plate and the conductive component are clamped through the mating portion and the recessed portion which are correspondingly provided.

In this embodiment, the recessed portion is provided to clamp with the mating portion, such that the reliability of the connection between the first connecting plate and the conductive component can be further improved.

Figure 18:
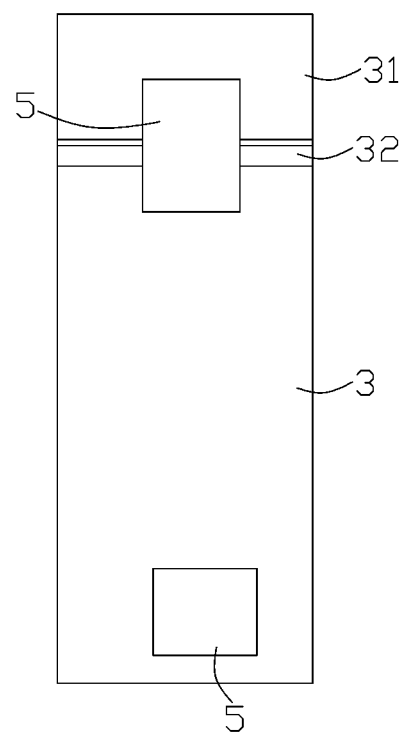
FIG. 18 is a schematic diagram of the structure of the conductive component in FIG. 7 according to a fifth specific embodiment.

In another specific embodiment, as shown in FIG. 18, the conductive component 3 may be provided with two recessed portions 5, where the recessed portion 5 may specifically be a through hole 51 and the through hole 51 is used to clamp with the mating portion provided on the first connecting plate.

Figure 19:
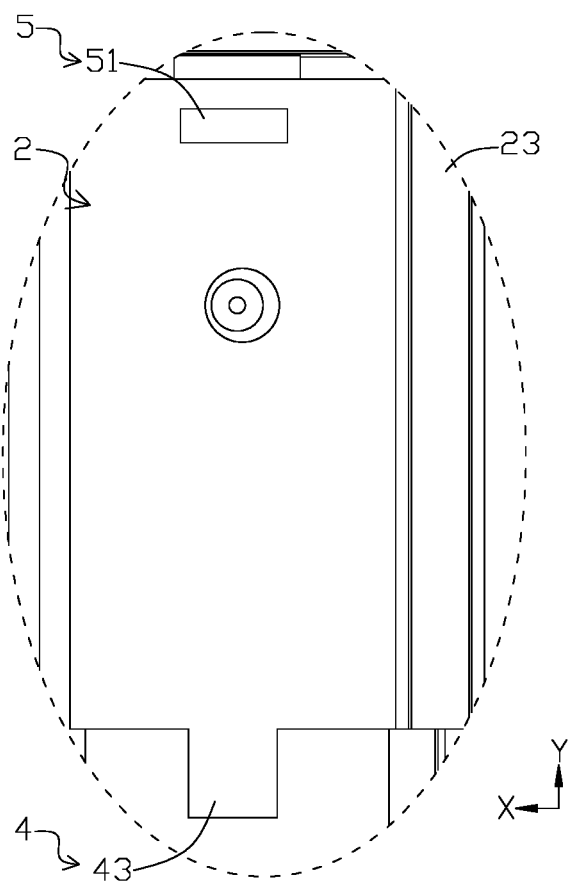
FIG. 19 is a partially enlarged view of part I in FIG. 3.
Figure 20:
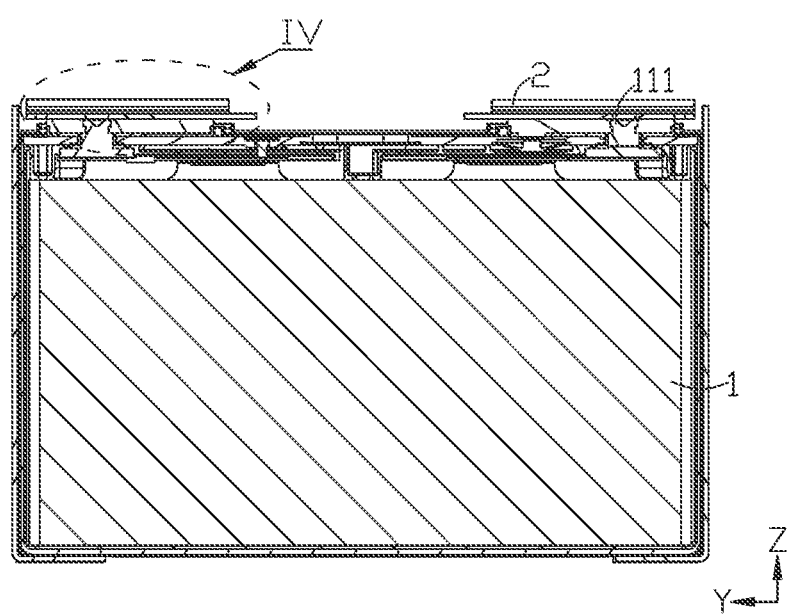
FIG. 20 is a cross-sectional view taken along the line A-A of FIG. 3.

In the above embodiments, as shown in FIG. 19, in the battery module, the structure of the first connecting plate 21 and the second connecting plate 22 may be the same, that is, each connecting plate in the battery module has the same structure. When the battery module fails, each connecting plate 2 of the battery module can be used to mate with the conductive component. Therefore, when performing maintenance, only the corresponding conductive component needs to be connected to the connecting plate 2 and connected to the top cover of the battery unit, which has the advantage of convenient operation. At this time, in the battery module after failure treatment, the structures of the first connecting plate 21 and the second connecting plate 22 are the same.

Figure 21:
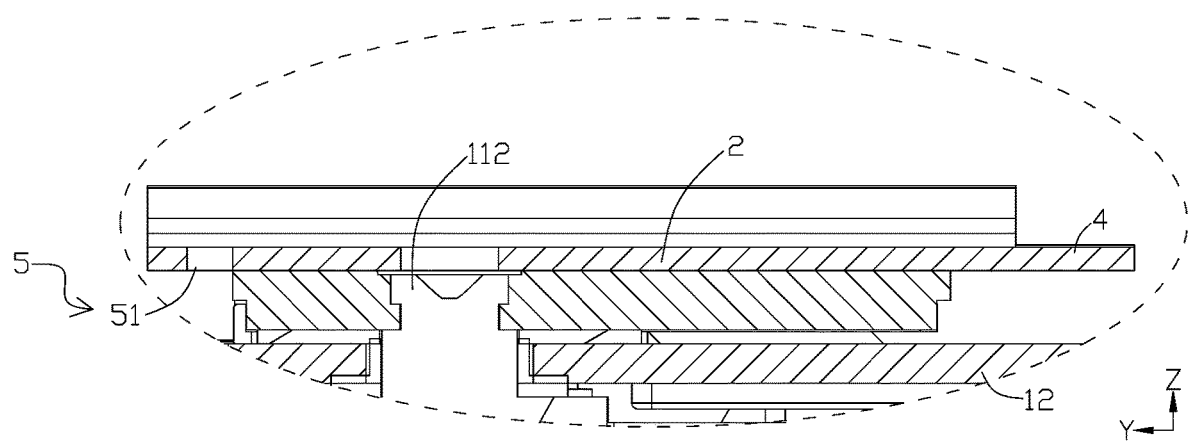
FIG. 21 is a partially enlarged view of part IV in FIG. 20.

For example, in the embodiment shown in FIG. 19, each connecting plate 2 in the battery module may be provided with a mating portion 4 and a recessed portion 5, where the mating portion 4 and the recessed portion 5 are used to connect to the mating portion and the recess portion of the conductive component. Specifically, as shown in FIG. 21, when connected to the second electrode terminal 112 of the battery unit, the mating portion 4 of the connecting plate 2 and the top cover 12 have a predetermined distance along the height direction Z of the battery unit, thereby preventing short-circuiting the connecting plate 2 and the top cover 12.

In another specific embodiment, each connecting plate in the battery module may be a common plate structure on the market, that is, each connecting plate may not be provided with a mating portion and a recessed portion. When the battery module fails, the connecting plate connected to the battery unit is replaced with a first connecting plate provided with a mating portion and/or a recessed portion (the structure of the first connecting plate is as described in any of the above embodiments), and the specific replacement solution is: the connecting plate connected to the failed battery unit is removed from the battery module, and the first connecting plate is connected to the electrode terminal of the failed battery unit, and then the first connecting plate is connected to the top cover of the failed battery unit through a conductive component to realize the failure processing of the failed battery unit to make the battery module resume working. At this time, in the battery module after failure treatment, the structures of the first connecting plate and the second connecting plate are different.

In addition, the embodiment of the present application also provides a failure handling method, which is used for processing the failed battery unit 13 in the battery module. Where, as shown in FIG. 4, the battery module M2 includes a connecting plate 2 for connecting with the electrode terminal 11 of the battery unit 1, and the connecting plate connected with the failed battery unit 13 is the first connecting plate 21. As shown in FIG. 7, one of the first connecting plate 21 and the conductive component 3 is provided with a mating portion 4. Based on the above structure, the failure processing method includes:

S1: connecting the conductive component 3 with the top cover 12 of the failed battery unit 13;

S2: mating the mating portion 4 with the other of the first connecting plate 21 and the conductive component 3 to realize the connection between the top cover 12 of the failed battery unit 13 and the first connecting plate 21 through the conductive component 3, so that the battery module can resume working.

In this embodiment, connecting the top cover 12 of the failed battery unit 13 and the first connecting plate 21 through the conductive component 3 can achieve the purpose of short-circuiting the failed battery unit 13 and make the battery module resume working. In addition, the conductive component 3 and the first connecting plate 21 are mechanically connected to improve the life of the battery module.

Where, it should be noted that the above steps S1 and S2 do not have a strict sequence, that is, step S1 can be performed firstly and then step S2 can be performed, or step S2 can be performed firstly and then step S1 can be performed, or steps S1 and S2 can be performed simultaneously. In addition, there may be other steps between steps S1 and S2, as long as the above-mentioned purpose can be achieved.

In a possible design, the mating portion 4 extends toward the other of the first connecting plate 21 and the conductive component 3. At this time, the above step S2 may specifically include:

S21: clamping one of the first connecting plate 21 and the conductive component 3 through mating portion 4 and the other, so as to realize the connection between the first connecting plate 21 and the conductive component 3.

In this embodiment, when the first connecting plate 21 and the conductive component 3 are clamp-connected, the connection area of the two is relatively large, so that the reliability of the mechanical connection between the two can be improved.

Specifically, at least one of the first connecting plate 21 and the conductive component 3 is further provided with a recessed portion 5. Based on this, the step S21 may specifically include:

S211: mating the recessed portion 5 with the mating portion 4 to realize the connection between the first connecting plate 21 and the conductive component 3.

More specifically, when the first connecting plate 21 and the conductive component 3 are clamp-connected, the above step S211 specifically is:

S211a: extending the mating portion 4 toward the other of the first connecting plate 21 and the conductive component 3, so that the other of the first connecting plate 21 and the conductive component 3 can be clamped with one of the first connecting plate 21 and the conductive component 3 through the mating portion 4, and during the clamping process, the mating portion 4 provided in the one of the first connecting plate 21 and the conductive component 3 is mating with the recessed portion 5 provided in the other of the first connecting plate 21 and the conductive component 3.

In this embodiment, the recessed portion 5 is provided to mate with the mating portion 4, such that the reliability of the connection between the first connecting plate 21 and the conductive component 3 can be further improved.

In a specific embodiment, the aforementioned recessed portion 5 may be a through hole 51. Based on this, the above-mentioned step S211 may specifically include:

S211b: extending at least part of the mating portion 4 toward the other of the first connecting plate 21 and the conductive component 3 through the through hole 51, so that the mating portion 4 and the other of the first connecting plate 21 and the conductive component 3 clamp the one of the first connecting plate 21 and the conductive component 3, and the mating portion 4 plug-connects the through hole 51, so as to realize the connection between the first connecting plate 21 and the conductive component 3.

In another possible design, the above step S2 may specifically include:

S22: clamping the mating portion 4 with the other of the first connecting plate 21 and the conductive component 3 to realize the connection between the first connecting plate 21 and the conductive component 3.

In this embodiment, when the first connecting plate 21 and the conductive component 31 are clamped, the structure of the two is simple, and the reliability of the mechanical connection between the two is high.

Specifically, at least one of the first connecting plate 21 and the conductive component 3 is further provided with a recessed portion 5. Based on this, the step S22 may specifically include:

S221: clamping the recessed portion 5 with the mating portion 4 to realize the connection between the first connecting plate 21 and the conductive component 3.

In this embodiment, the reliability of the clamping connection between the first connecting plate 21 and the conductive component 3 can be further improved by providing the recessed portion 5 which can clamp with the mating portion 4.

More specifically, the aforementioned recessed portion 5 may be a through hole 51. Based on this, the aforementioned step S221 may specifically include:

S221a: clamping at least part of the mating portion 4 with the through hole 51 to realize the connection between the first connecting plate 21 and the conductive component 3.

In the above embodiments, when the battery module M2 doesn't fail, the connecting plate 2 may include the mating portion 4 and/or the recessed portion 5. When the battery module M2 fails, only connecting the conductive component 3 that can mate with the connecting plate 2 is required (corresponding recessed portion 5 mates with mating portion 4), which can cause less maintenance processes.

In another specific embodiment, when the battery module M2 doesn't fail, the connecting plate 2 may be a common plate structure on the market, which doesn't include the mating portion 4 and the recessed portion 5. When the battery module M2 fails, the connecting plate connected to the failed battery unit 13 is removed firstly (for example, cutting off the connection between the connecting plate and the electrode terminal), and replace it with the first connecting plate 21 (including the mating portion 4 and/or the recessed portion 5). The first connecting plate 21 is connected to the electrode terminal 11 of the failed battery unit 13, and then the first connecting plate 21 is connected to the top cover 12 of the failed battery unit 13 through the conductive component 3. During the connection process, the conductive component 3 and the first connecting sheet 21 are connected through the above-mentioned mating portion 4.

In this embodiment, the structure of the connecting plate 2 in the battery module M2 is relatively simple, and it is not necessary that all the connecting plates are provided with the structure which include the mating portion 4 and/or the recessed portion 5, thereby saving cost.

In the above embodiments, the conductive component 3 may further include a connecting portion 31. Based on this, the above step S1 may specifically include:

S11: connecting the connecting portion 31 and the top cover 12 of the failed battery unit 13 through conductive material.

For example, the connecting portion 31 and the top cover 12 can be welded, or connected by conductive adhesive, or connected by pouring molten tin, aluminum, or other metals. When the two are welded, the solder is located in the preset gap between the connecting portion 31 and the top cover 12, thereby the two are connected and the two can be conductive. When the two are connected by conductive adhesive, the conductive adhesive is located in the preset gap between the connecting portion 31 and the top cover 12, thereby the two are connected and the two can be conductive. When the two are connected by molten metal, the molten metal is located in the preset gap between the connecting portion 31 and the top cover 12 after cooling, thereby the two are connected and the two can be conductive.

In this embodiment, when the connecting portion 31 of the conductive component 3 and the top cover 12 are connected by conductive adhesive, the electrical and mechanical connection between the conductive component 3 and the top cover 12 can be realized, and the connection is facilitated by conductive adhesive, which can avoid the battery unit damage caused by welding.

In addition, when the battery module loses its function due to the existence of a failed battery unit, firstly determine the position of the failed battery unit in the battery module, then clean the top cover of the failed battery unit, and clean the connecting plate connected to the failed battery unit. After the cleaning is completed, conductive material is arranged on the top cover, and the above-mentioned connecting plate and the top cover are connected through a conductive component to achieve the purpose of short-circuiting the electrode assembly of the failed battery unit and reconnect the circuit of the battery module.

The foregoing is merely illustrative of the optional embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A battery module, comprising:
   a plurality of battery units configured to be serially-connected, wherein the plurality of battery units comprises a failed battery unit and at least one non-failed battery unit adjacent to the failed battery unit after the battery module fails;
   a first connecting plate configured to physically connect the failed battery unit to the at least one non-failed battery unit; and
   a conductive component configured to be electrically connected to a top cover of the failed battery unit;
   wherein one of the first connecting plate and the conductive component is provided with a mating portion, and the other of the first connecting plate and the conductive component is provided with a recessed portion configured to be connected to the corresponding mating portion in a mating manner, wherein the mating portion is configured to be connected to the recessed portion so that the battery module resumes working.

2. The battery module according to claim 1, wherein the first connecting plate and the conductive component are clamp-connected through the mating portion.

3. The battery module according to claim 1, wherein the first connecting plate and the conductive component are plug-connected through the mating portion.

4. The battery module according to claim 1, wherein the recessed portion is a through hole and the mating portion is plug-connected to the through hole.

5. The battery module according to claim 1, wherein a plurality of mating portions are provided, and the plurality of mating portions are arranged at intervals.

6. The battery module according to claim 1, wherein the mating portion comprises a limiting hook.

7. The battery module according to claim 6, wherein the mating portion further comprises an extension portion connecting at least one of the first connecting plate and the conductive component to the limiting hook.

8. The battery module according to claim 1, wherein the conductive component is connected to the top cover of the failed battery unit through a connecting portion.

9. The battery module according to claim 8, wherein the conductive component comprises the connecting portion and a transition portion, wherein the transition portion is connected to the connecting portion.

10. The battery module according to claim 1, wherein the mating portion is configured to be a bump.

11. A battery group, comprising:
a battery module, comprising:
a plurality of battery units configured to be serially-connected, wherein the plurality of battery units comprises a failed battery unit and at least one non-failed battery unit adjacent to the failed battery unit after the battery module fails;
a first connecting plate configured to physically connect the failed battery unit to the at least one non-failed battery unit; and
a conductive component configured to be electrically connected to a top cover of the failed battery unit;
wherein one of the first connecting plate and the conductive component is provided with a mating portion, and the other of the first connecting plate and the conductive component is provided with a recessed portion configured to be connected to the corresponding mating portion in a mating manner, wherein the mating portion is configured to be connected to the recessed portion so that the battery module resumes working; and
a box body configured to accommodate the battery module.

12. The battery group according to claim 11, wherein the first connecting plate and the conductive component are clamp-connected or plug-connected through the mating portion.

13. The battery group according to claim 11, wherein the recessed portion is a through hole and the mating portion is plug-connected to the through hole.

14. An apparatus, comprising: a battery group, the battery group being configured to provide electrical energy, the battery group comprising:
a battery module, comprising:
a plurality of battery units configured to be serially-connected, wherein the plurality of battery units comprises a failed battery unit and at least one non-failed battery unit adjacent to the failed battery unit after the battery module fails;
a first connecting plate configured to physically connect the failed battery unit to the at least one non-failed battery unit; and
a conductive component configured to be electrically connected to a top cover of the failed battery unit;
wherein one of the first connecting plate and the conductive component is provided with a mating portion, and the other of the first connecting plate and the conductive component is provided with a recessed portion configured to be connected to the corresponding mating portion in a mating manner, wherein the mating portion is configured to be connected to the recessed portion so that the battery module resumes working.

* * * * *